United States Patent [19]

Nakao et al.

[11] 4,200,966
[45] May 6, 1980

[54] APPARATUS FOR FIXING METAL CLAMP BANDS

[75] Inventors: Masatane Nakao, Fukuroi; Yoshiji Ikuta, Iwata, both of Japan

[73] Assignee: NTN Toyo Bearing Company, Osaka, Japan

[21] Appl. No.: 890,393

[22] Filed: Mar. 27, 1978

[30] Foreign Application Priority Data

Mar. 25, 1977 [JP] Japan .................................. 53-4690
May 10, 1977 [JP] Japan ................................ 52-53830

[51] Int. Cl.² .......................................... B23P 11/00
[52] U.S. Cl. ................................................ 29/243.5
[58] Field of Search .............. 29/243.5, 243.52, 243.56

[56] References Cited

U.S. PATENT DOCUMENTS 3,037,208   6/1962   Haberstump ...................... 29/243.56

Primary Examiner—James L. Jones, Jr.
Attorney, Agent, or Firm—Armstrong, Nikaido, Marmelstein & Kubovcik

[57] ABSTRACT

An apparatus whereby a dust proof cover, i.e., rubber boot fitted over a universal joint part interposed between rotary shafts is clamped and fixed at its opposite ends onto the mating parts by using metal clamp bands. The apparatus comprises a support mechanism for rotatably supporting the opposite ends of the object to be clamped having non-clamped metal clamp bands mounted thereon and for axially positioning the object, a buckle positioning mechanism for establishing the relative positional relation between the buckle members of the metal clamp bands and a buckle bending mechanism, and a stick tilting mechanism comprising a rotatably supported shaft member extending parallel with the axis of the object, arms fixed on the shaft member for tilting the stick members, and a device for rotating the shaft, the buckle tilting mechanism comprising a first cylinder device having pawl members for bending the buckle members onto the tilted stick members, and a second cylinder device for pressing the bent buckle members onto the stick members by the closed pawl members to completely cover the stick members with the buckle members.

4 Claims, 12 Drawing Figures

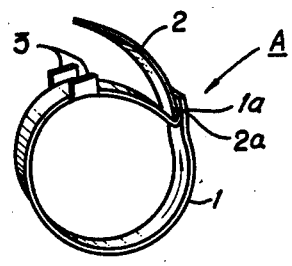
FIG 1
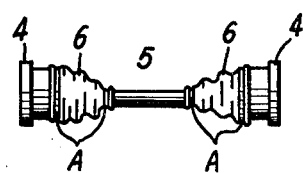
FIG 2
FIG 3
(a) 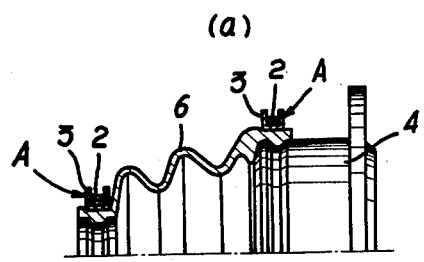
(b) 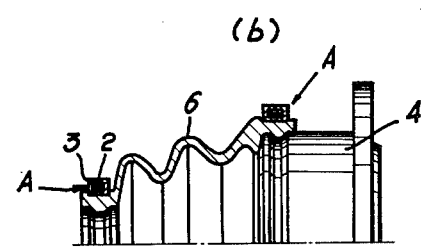

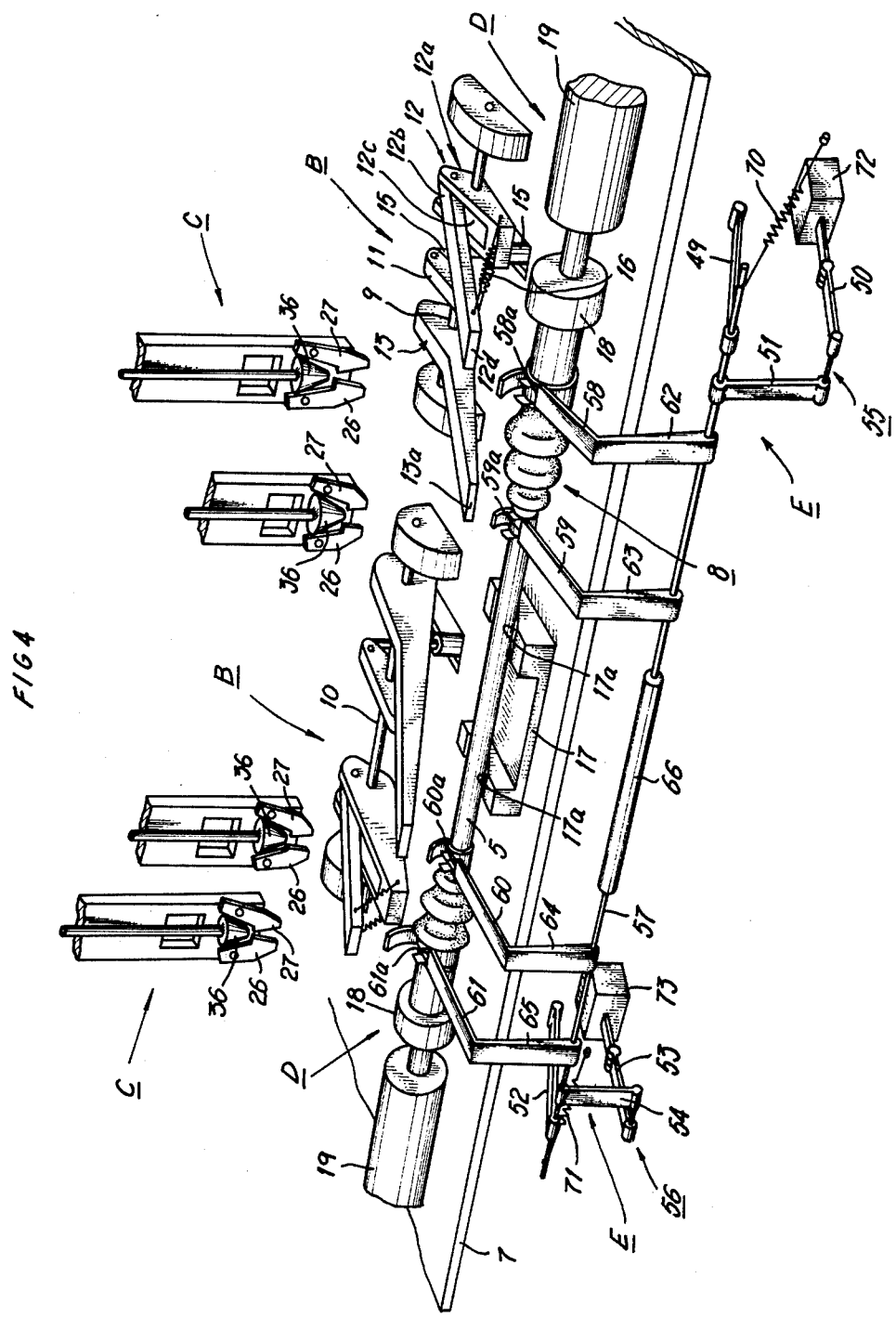

APPARATUS FOR FIXING METAL CLAMP BANDS

BACKGROUND OF THE INVENTION (a) Field of the Invention

The present invention relates to an apparatus for fixing metal clamp bands which are used to clamp various seals and hoses.

(b) Objects of the Invention

An object of the present invention is to automate the fixing of metal clamp bands described in U.S. Pat. No. 3,797,077 to achieve increased efficiency of operation, uniform tightening force and labor-saving.

DESCRIPTION OF THE PRIOR ART

A clamp band A to which the present invention is applied is constructed in the manner shown in FIG. 1. It is used in various places and in various ways. The clamp band A is formed by overlapping the ends of a bank-like metal member 1 and welding a relatively rigid stick 2 to the overlap. The metal member 1 has a pair of buckles 3 provided on the opposite sides thereof for fixedly securing the stick 2. FIG. 2 illustrates a uniform velocity ball joint comprising end members 4 connected together by a small-diameter shaft 5, rubber boots 6 mounted over the connections, and clamp bands A clamping said rubber boots 6. The conventional method of clamping using clamp bands A will now be described with reference to FIG. 3. First, as shown in FIG. 3a, the stick 2 of each clamp band A is tilted toward the buckles 3 either manually or by a holding-down device utilizing the forward movement of a cylinder, and then the buckles 3 are hammered so that they are bent to cover the stick 2, thereby fixedly securing the latter. The clamping force of the clamp band A in this case is obtained by the fact that the tilting of the stick 2 causes the end 1a of the metal member 1 to be drawn in a counterclockise direction on the principle of the lever with the base 2a of the stick serving as a fulcrum.

With such method, however, since the bending of the buckles 3 is manually effected, uniform and satisfactory bending and covering cannot be attained. Further, there is the danger of the boots 6, members 4 and/or connecting shaft 5 being damaged with a hammer during the bending operation. Since manual operation is involved, mass production is impossible.

In this connection, it is to be understood that the term bending as used herein principally means the bending of the buckles and the term covering means completing said bending.

SUMMARY OF THE INVENTION

The present invention is intended to provide a clamp band fixing apparatus comprising a support mechanism for rotatably supporting the opposite ends of an object to be clamped which has non-clamped metal clamp bands mounted thereon and for axially positioning said object, a buckle positioning mechanism for effecting relative positioning between the buckle members of the metal clamp bands and a buckle bending mechanism, and a stick tilting mechanism comprising a rotatably supported shaft extending parallel with the axis of said object, arms fixed on said shaft for tilting the stick members of the metal clamp bands, and means rotating said shaft, said buckle bending mechanism comprising first cylinder means extending radially of said object and having pawl members for bending buckle members onto the tilted stick members and second cylinder means for causing the closed pawl members to press the thus bent buckle members to completely cover the tilted stick members.

FEATURES OF THE INVENTION

According to the present invention, the operation of aligning the non-clamped metal clamp bands mounted on the object to bring them into a predetermined bending position prior to bending operation, the operation of tilting the upright stick members, and the operation of completely covering the tilted stick members with the buckle members are automatically carried out by a series of mechanisms. Therefore, the invention, if applied to mass production of uniform velocity ball joints used in automobiles, greately increases the efficiency of operation. Further, the clamping forces of the metal clamp bands can be made uniform, and damage to the boots due to excessive clamping force can be avoided. According to the invention, since the object is supported at its opposite ends, even if the object is a uniform velocity ball joint capable of plunging, the fixing of the clamp band is possible by permitting the ball joint to plunge upto the middle limit position. Further, the simultaneous clamping of a plurality of axially spaced metal clamp bands mounted on the object is possible. Further, the apparatus of the invention achieves labor saving in the metal clamp band fixing operation.

BRIEF DESCRIPTION OF THE DRAWINGS

FIG. 1 is a perspective view of a metal clamp band;

FIG. 2 illustrates an embodiment of the invention showing how metal clamp bands are used;

FIGS. 3a and 3b show a condition in which metal clamp bands are mounted on rubber boots and sticks are pushed into between buckles and a second condition in which the sticks are fixed in position by the buckles;

FIG. 4 is a perspective view showing the principal portion of a metal clamp band fixing apparatus according to the invention;

DESCRIPTION OF THE PREFERRED EMBODIMENTS

Figure 7:
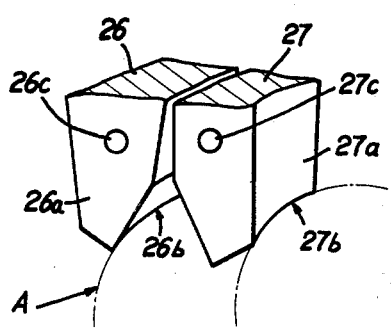
FIG. 7 is a perspective view showing the shape of the front ends of pawls in the bending mechanism.

An apparatus for clamping rubber boots according to the invention, as shown in FIG. 3, comprises a support mechanism D for rotatably supporting the opposite ends of an object to be clamped which has non-clamped metal bands mounted thereon, a buckle positioning mechanism E, a mechanism B for tilting sticks 2, and a mechanism C for bending buckles 3.

The support mechanism D, as shown in FIG. 4, comprises a support block or anvil 17 for supporting the intermediate shaft member 5 of the uniform velocity ball joint, and positioning plates 18 for rotatably holding and axially positioning the object placed on said block. The block 17 has a V-groove 17a for effecting radial positioning. The positioning plates 18 are adapted to be axially advanced and retracted by air cylinders 19. Thus, the said object is placed in the V-groove of the block and positioned by the positioning plates at the opposite ends, thereby controlling the relative positional relation between the various mechanisms to be presently described and the object.

Figure 5:
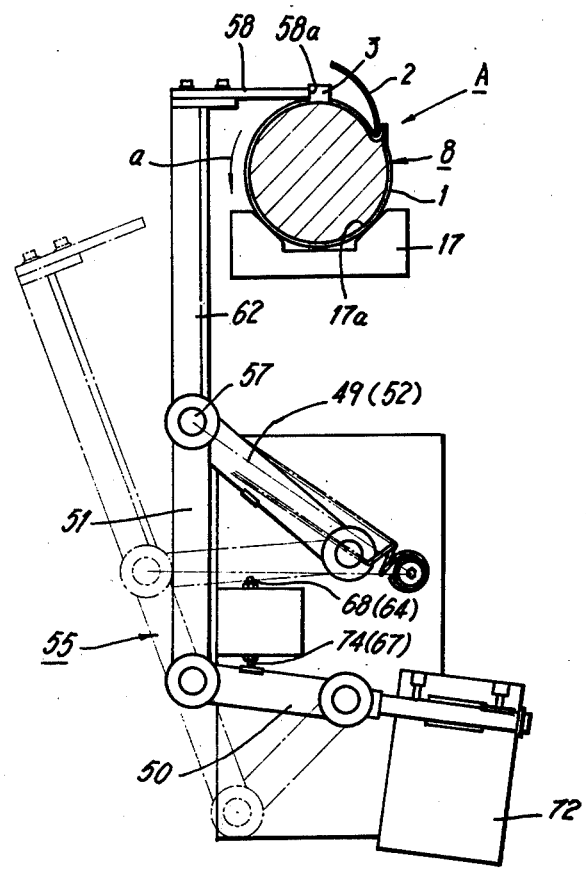
FIG. 5 is a side view of a buckle positioning mechanism.

The buckle positioning mechanism E, as shown in FIGS. 4 and 5, comprises a shaft member 57 disposed in front of the frame to extend parallel with the axis of the object 8 and supported at its opposite ends by likages 55 and 56 comprising links 49, 50, 51 and 52, 53, 54, and a plurality of lever members 62, 63, 64 and 65 fixed at their bases on the shaft member 57 and having metal heads 58, 59, 60 and 61 fixed to the front ends thereof. The lever members are fixed on the shaft member 57 at positions opposed to the metal clamp bands mounted on the object, while the metal heads fixed to the front ends of the lever members extend to positions above the top surfaces of the metal clamp members where they abut against the buckle members. The shaft member has a handle member 66 provided between the ends thereof. The shaft member is operated by the handle to be moved between a lever raising position shown in solid lines and a lever tilting position shown in dot-dash lines in FIG. 5. The raising position is controlled by the fact that the links 50 and 53 abut against first stop members 74 and 67 installed on the frame, while the tilting position is controlled by the fact that the links 49 and 52 abut against second stop members 68 and 69 installed on the frame. The likages are acted upon by springs 70 and 71 whereby the lever members are stabilized in the lever raising and tilting positions. The numerals 72 and 73 designate balance weights provided on the ends of the links 50 and 53 for assuring smooth operation of the handle.

In the above arrangement, the handle is operated to its upper position, and with the lever members raised the front metal head ends 58a, 59a, 60a and 61a effect the positional control of the associated buckle members.

The stick tilting mechanism B, as shown in FIG. 4, has shafts 9 and 10 disposed above a surface plate and extending parallel with the axis of the workpiece 8. The shafts 9 and 10 have brackets and arms 12 and 13 fixed thereon, said arms 12 and 13 being opposed to the axially spaced clamp bands A on the workpiece 8. Each bracket 11 has the piston rod 15 of an air cylinder 14 attached thereto. The arm 12 comprises a bifurcated bracket 12a and an arm 12b which is pivotally connected to the bifurcation 12c of the bracket 12a and which has a spring 16 connected to the other end thereof, so that the arm 12b is pulled toward the bracket 12a at all times.

Figure 6:
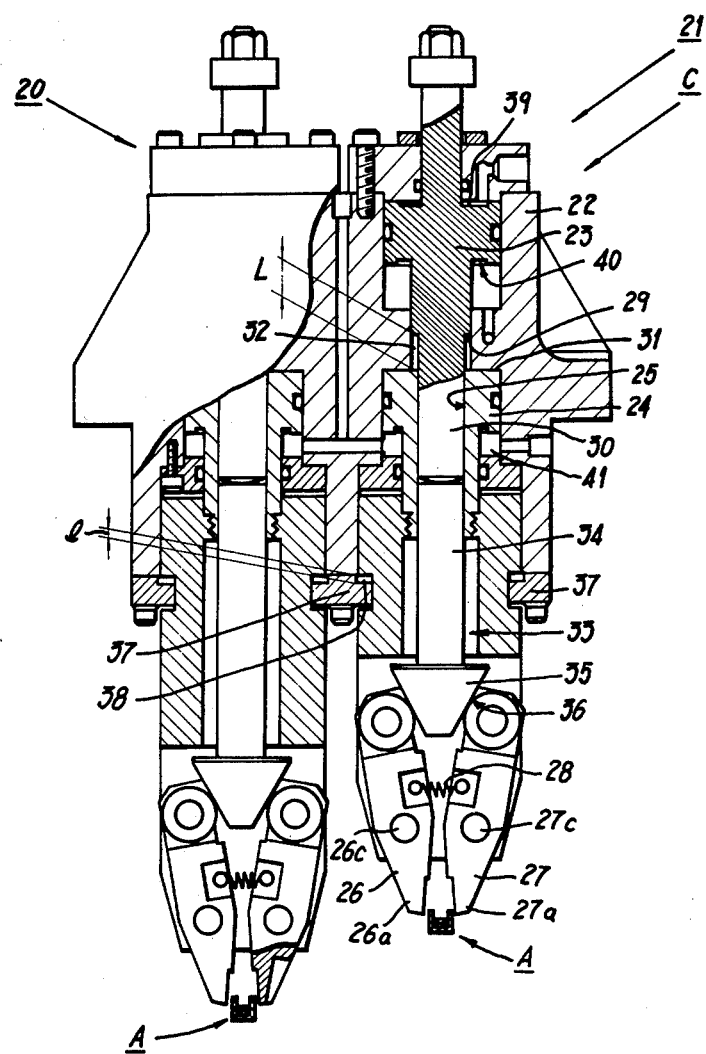
FIG. 6 is a longitudinal section of a buckle bending mechanism.

The mechanism C for bending the buckles 3 will now be described. This mechanism C comprises two axially spaced like units radially opposed to the workpiece 8. FIG. 6 shows one of said units. In FIG. 6, the numeral 20 designates a tool for bending a clamp band A which is mounted on the small diameter portion while 21 designates a tool for bending a clamp band mounted on the large diameter portion, said two tools being similarly constructed. The numeral 22 designates a main body. The numerals 23 and 24 designate pistons coaxially installed in the main body 22. The piston 23 is a double acting piston in which the hydraulic pressure (or air pressure) acts on each side of the piston alternately, while the piston 24 is a single acting piston in which it acts on only one side of the piston. The single acting piston 24 has a central through-hole 25 and two opposed pawls 26 and 27 attached to the front end thereof. The pawls 26 and 27 are pivoted to the single acting piston 24 substantially intermediate between the ends thereof, and a spring 28 is attached to them to normally urge their front ends 26a and 27a away from each other. The front pawl ends 26a and 27a are formed with arcuate portions 26b and 27b which conform to the shape (or outer periphery) of the associated clamp band when the pawls 26 and 27 are closed, as shown in FIG. 7.

The double acting piston 23 has a shaft 30 provided with a step (or a different diameter portion) 29, said shaft 30 being inserted in the through-hole 25 of the single acting piston 24. A clearance 32 providing a stroke L is defined between the step 29 and the head 31 of the single acting piston 24 in the normal state (i.e., the state shown in FIG. 6) so that the step 29 may abut against the head 31 in the course of the downward movement of the double acting piston 23. The numeral 33 designates a floating member comprising a shaft 34 and a cone 35, said shaft 34 being inserted in said through-hole 25, said cone 35 having an inverted frustoconical taper slide surface 36 which acts between the pawls 26 and 27. The numeral 37 designates a stop member for the single acting piston 24. Thus, the stroke of the single acting piston 24 is set at l which corresponds to a clearance 38 between the two members 24 and 37. The numeral 39 designates an upper hydraulic pressure chamber for the double acting piston 23; 40 designates a lower hydraulic pressure chamber therefor; and 41 designates a lower hydraulic pressure chamber for the single acting piston 24.

The way the fixing apparatus constructed in the manner described above operates will now be described.

Figure 8:
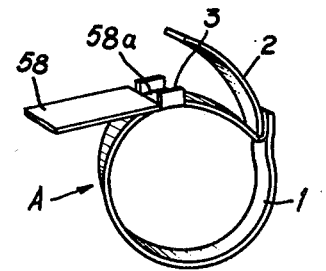
FIG. 8 shows how the buckles are positioned by metal heads.

First of all, the workpiece 8 assembled in the preceding step is placed on the block 17 and clamp bands A are then mounted on the rubber boots 6. The sticks 2 are then slightly tilted to bring the bands A into a semi-locked state. In order to properly position the clamp bands A relative to the mechanisms E, B and C, one or both of the air cylinders 19 of the mechanism D are actuated according to circumstances, thereby holding the workpiece 8 between the holder plates 18 to effect the axial positioning. When the positioning between the workpiece 8 and the mechanisms E, B, C has thus been completed, the metal heads 58, 59, 60 and 61 of the mechanism E are then brought to the solid line position in FIGS. 4 and 5, whereupon the workpiece 8 is rotated in the direction of arrow a to bring the buckle members 3 of the bands A into abutment against the front ends of the metal heads, as shown in FIG. 8. Since the bands are not so tightly fitted on the workpiece, after the buckle members abut against the metal heads, the bands are held stationary while the workpiece alone is rotated. In addition, if the buckle members happen to be located in the path of movement of the metal heads, the latter will come in contact with the buckle members in the course of travel of the metal heads to the control position, thus bringing the buckle members to the control position while rotating them on the workpiece. When all the buckle members come into line in the manner described above, the handle is again operated to retract the metal heads. Subsequently, the mechanism B for holding down the sticks 2 is actuated, causing the cylinders 14 to extend the piston rods 15 to turn the shafts 9 and 10 through the brackets 11. As a result, the arms fixed on the shafts 9 and 10 are rotated, depressing the sticks 2 of the clamp bands A with their front ends 12d and 13a. In addition, the amounts of rotation of the arms 12 and 13 are the same and some of the clamps bands A are mounted on the small diameter portions of the workpiece 8 and the others on the large diameter portions. Therefore, the distances the arms 12 and 13 have to travel to reach the associated clamp bands are different. Under these circumstances, when the arms 12 depress the sticks 2 of the clamp bands A mounted on the small diameter portions, if the operation of the cylinders 14 is stopped and the rotation of the arms 12 and 13 is stopped, then there arises a problem that the arms 13 associated with the clamp bands A mounted on the small diameter portions cannot depress the sticks 2. With this problem in mind, according to the invention, the amount of movement of the cylinders 14 is detected as by a photodetector (not shown) when the arms 13 associated with the clamp bands A on the small diameter portions have depressed the sticks 2, thereby stopping the cylinders. In the arms 12 associated with the clamp bands A on the large diameter portions, after the sticks 2 have been depressed, each bracket 12a alone is rotated against the force of the spring 16. In addition, the arms depress the bases of the sticks so as not to interfere with the bending operation on the buckles in the subsequent step.

Figure 9:
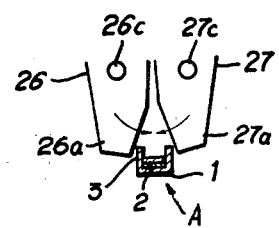
FIGS. 9 through 11 show the movement of the front ends of the pawls in a series of bending steps.

After the holding-down mechanism B has depressed the sticks 2 in this manner, this condition is maintained and the bending mechanism C for the buckles 3 is then actuated. The bending mechanism C starts to descend by means of a lifting cylinder (not shown) installed in the main body 22 until a condition is established in which the buckles 3 are disposed between the pawls 26 and 27, as shown in FIG. 9. In the condition shown in FIG. 9, the double and single acting pistons 23 and 24 have been raised with control hydraulic pressure supplied to the lower hydraulic pressure chambers 40 and 41 and the taper slide surface 36 of the floating member 33 is under tension exerted by the spring 28 through the pawls 26 and 27. Therefore, the floating member 33 has been pushed up, with its shaft 34 abutting against the shaft 30 of the double acting piston 23.

Figure 10:
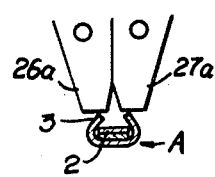

The bending mechanism C detects the above condition and starts bending operation on the buckles 3. More specifically, the lower hydraulic pressure chamber 40 of the double acting piston 23 is caused to communicate with an oil discharge port (not shown), while control hydraulic pressure is supplied to the upper hydraulic pressure chamber 39, whereupon the double acting piston 23 starts to descend under the hydraulic pressure in the upper hydraulic chamber 39, with its shaft 30 sliding down along the wall of the through-hole 25 of the single acting piston 24 to lower the shaft 34 of the floating member 33. As a result, the taper slide surface 35 of the floating member 33 wedges between the pawls 26 and 27, thus outwardly moving the upper ends of the pawls 26 and 27 away from each other. The pawls 26 and 27 are turned around their respective pivots 26c and 27c, with their front ends 26a and 27a moving inwardly toward each other. The step 29 on the double acting piston 23 comes to abut against the head 31 of the single acting piston 24 and stops. The downward movement of the double acting piston 23 through the stroke L establishes the folded condition of the front pawl ends 26a and 27a, as shown in FIG. 10. The aforesaid turning of the front pawl ends 26a and 27a results in the buckles 3 of the clamp bands A being slightly inwardly bent, and at the end of the turning, the front pawl ends are positioned on upper ends of the bent buckles 3.

Figure 11:
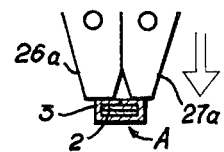

The hydraulic pressure chamber 41 of the single acting piston 24 is then caused to communicate with the discharge port, whereupon the single acting piston 24 starts to descend together with the double acting piston 23 under the hydraulic pressure in the upper hydraulic pressure chamber 39 of the double acting piston 23 until it abuts against the stop member 37. This is the downward movement of the single acting piston 24 through the stroke l. Thereby, the arcuate portions (lower ends) 26b of the pawls 26 and 27 press the buckles 3 flat so as to completely cover the sticks 2, as shown in FIG. 11. In brief, the stroke of the double acting piston 23 is the sum of the strokes L and l, and the stroke L provides the turning of the pawls 26 and 27 for the initial bending of the buckles 3 while the stroke l serves for the pressing of the buckles 3.

When the bending operation on the buckles 3 by the bending mechanism C is thus completed, it is necessary to cause the return movement of the bending mechanism C and the stick holding-down mechanism B. The return movement is started with the bending mechanism C. While hydraulic pressure is supplied to the hydraulic pressure chamber 41 of the single acting piston 24, the upper hydraulic pressure chamber 39 of the double acting piston 23 is caused to communicate with the oil discharge port and hydraulic pressure is supplied to the lower hydraulic pressure chamber 40 of the double acting piston 23. The double acting piston 23 is upwardly moved to return by the control hydraulic pressure in the lower hydraulic pressure chamber 40. This return movement of the double acting piston 23 removes the depressing force from the floating member 33. As a result, the only force acting on the floating member 33 is the resilient force of the spring 28 pulling the pawls 26 and 27, so that under the action of the taper slide surface 38, the floating member 33 follows the shaft 30 of the double acting piston 23. The upward movement of the floating member 33 permits the resilient force of the spring 28 to turn the pawls 26 and 28 around the pivots 26c and 27c to outwardly move the front pawl ends 26a and 27a away from each other, thereby returning the pawls 26 and 27. Thereafter, the lifting cylinder is returned to raise the bending mechanism C.

Subsequently, the stick holding-down mechanism B is returned. This is effected by simply causing the retraction of the cylinders 14, whereby the arms 12 and 13 fixed on the shafts 9 and 10 are rotated through the brackets 11.

Finally, the mechanism D is returned and the finished article is taken out.

While there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

What is claimed is:

1. An apparatus for fixing a metal clamp band having a stick member and buckle members onto an object to be clamped, said apparatus comprising:

(a) a stick tilting means for tilting the stick member of said band towards the object, said stick tilting means including a rotatable shaft member extending parallel to the axis of said object, arm means fixed to said shaft member for tilting said stick member when said shaft member is rotated and means for rotating said shaft member;

(b) buckle bending means for bending said buckle members to engage said stick member after said stick member has been tilted, said buckle bending means including a first and second cylinder means, pawl means coupled on said first and second cylinder means, said pawl means engaging said buckle members and bending said buckle members around said stick member when said first cylinder means is actuated and said pawl means engaging said bent buckle members and pressing said bent buckle members against said stick member when said second cylinder means is actuated, whereby said buckle members surround and engage said stick member.

2. An apparatus as set forth in claim 1 wherein said first cylinder means comprises a double acting piston and a shaft extending therefrom, wherein said second cylinder means comprises a single acting piston having a hole therethrough, and wherein said buckle bending means includes a spring means for urging apart the forward ends of said pawl means and a floating means having a shaft portion and a cone portion said shaft of said first cylinder means engaging said shaft portion and said second cylinder means engaging said cone portion wherein when said shaft portion is engaged and moved by said first cylinder means the sides of said cone means engage the rear portion of said pawl means and force the forward ends of said pawl means together against the action of said spring means thereby bending said buckle members around said stick member and when said cone means is engaged and moved forward by said second cylinder means the forward end of said cone means presses the bent buckle members against said stick members.

3. An apparatus as set forth in claim 1, wherein the forward ends of said pawl means are arcuate whereby said pawl means extend along the outer shape of said metal clamp band when they are closed.

4. An apparatus for fixing a metal clamp band having a stick member and buckle members onto an object to be clamped, said apparatus comprising:

(a) support means for rotatably supporting and axially positioning the ends of said object;

(b) a stick tilting means for tilting the stick member of said band towards the object, said stick tilting means including a rotatable shaft member extending parallel to the axis of said object, arm means fixed to said shaft member for tilting said stick member when said shaft member is rotated and means for rotating said shaft member;

(c) buckle bending means for bending said buckle members to engage said stick member after said stick member has been tilted, said buckle bending means including a first and second cylinder means, pawl means coupled on said first and second cylinder means, said pawl means engaging said buckle members and bending said buckle members around said stick member when said first cylinder means is actuated and said pawl means engaging said bent buckle members and pressing said bent buckle members against said stick member when said second cylinder means is actuated, whereby said buckle members surround and engage said stick member.

* * * * *